United States Patent [19]
Weingart et al.

[11] Patent Number: 6,132,880
[45] Date of Patent: Oct. 17, 2000

[54] EMTEC MAGNETICS GMBH

[75] Inventors: Franz Weingart, Nagoya, Japan;
Christa Hackl, Bad Essen, Germany;
Rudiger Krech, Diepholz, Germany;
Stephan Bauer, Hochdorf-Assenheim,
Germany; Albert Kohl, Laumersheim,
Germany; Ria Kress, Ludwigshafen,
Germany; Josef Schelble,
Zusmarshausen, Germany;
Hans-Ganther Bohrmann,
Ludwigshafen, Germany

[73] Assignee: EMTEC Magnetics GmbH, Germany

[21] Appl. No.: 09/128,765

[22] Filed: Aug. 4, 1998

[30] Foreign Application Priority Data

Aug. 12, 1997 [DE] Germany .......................... 197 34 893

[51] Int. Cl.$^7$ .................................................. G11B 5/702
[52] U.S. Cl. ..................... 428/423.1; 428/425.9; 428/694 BG; 428/694 BU; 428/900; 525/440; 525/444; 525/453; 525/454; 528/85
[58] Field of Search ............................. 428/423.1, 425.9, 428/694 BG, 900, 694 BU; 525/440, 444, 453, 454; 528/85

[56] References Cited

U.S. PATENT DOCUMENTS

| | | | |
|---|---|---|---|
| 2,871,218 | 1/1959 | Schollenberger | 260/45 |
| 2,899,411 | 8/1959 | Schollenberger | 260/77 |
| 4,131,731 | 12/1978 | Lai et al. | 528/370 |
| 4,152,485 | 5/1979 | Mizumura et al. | 428/425 |
| 4,320,171 | 3/1982 | Motz et al. | 428/423 |
| 4,420,531 | 12/1983 | Tokuda | 428/329 |
| 4,423,115 | 12/1983 | Tokuda et al. | 428/425 |
| 4,477,531 | 10/1984 | Kohler et al. | 428/425 |
| 4,568,612 | 2/1986 | Lehner et al. | 428/425 |
| 4,598,141 | 7/1986 | Fock | 528/293 |
| 4,748,084 | 5/1988 | Hata et al. | 428/425 |
| 5,266,407 | 11/1993 | Keppeler et al. | 428/425 |
| 5,266,408 | 11/1993 | Keppeler et al. | 428/425 |
| 5,556,918 | 9/1996 | Brodt et al. | 525/131 |
| 5,695,884 | 12/1997 | Ishimaru et al. | 428/423 |
| 5,756,637 | 5/1998 | Brodt et al. | 528/71 |

FOREIGN PATENT DOCUMENTS

| | | |
|---|---|---|
| 143337 | 6/1985 | European Pat. Off. . |
| 193 084 | 9/1986 | European Pat. Off. . |
| 3814536 | 4/1988 | Germany . |
| 57092421 | 11/1980 | Japan . |
| 57092422 | 11/1980 | Japan . |
| 2054622 | 2/1981 | United Kingdom . |

OTHER PUBLICATIONS

Database WPI, Week 945, Derwent Publications, Ltd., AN 363766, XP 002078908 (English abstract of JP 6287441, Oct. 11, 1994).
Fikentscher, *Cellulosechemie,* 13, 1932, pp. 58–64.
DIN 53157, May 1971.
DIN 53457, May 1968.
DIN 53455, August 1981.

*Primary Examiner*—Stevan A. Resan
*Attorney, Agent, or Firm*—Keil & Weinkauf

[57] ABSTRACT

The thermoplastic, isocyanate-free polyurethane which contains acidic groups, is soluble in tetrahydrofuran, has a molecular weight of from 15,000 to 70,000 and is composed of A) 1 mol of a polyol having a molecular weight of from 400 to 4000,
B) from 0.3 to 9 mol of a mixture of
  B1) if required, a diol of 2 to 18 carbon atoms and
  B2) from 0.03 to 0.4 mol of a diol having at least one acidic group,
C) from 0 to 1 mol of a polyol having 3 to 18 carbon atoms and at least 3 OH groups,
D) from 1.25 to 13 mol of a diisocyanate of 6 to 30 carbon atoms and
E) from 0 to 1 mol of a primary or secondary amino alcohol of 2 to 16 carbon atoms, the molar ratio of the OH and any NH groups present in the sum of the components A, B, C and E to the NCO groups of component D being from 0.98 to 1.4, is obtainable by reacting the above components in the melt and is suitable in particular as a binder for magnetic recording media.

15 Claims, No Drawings

EMTEC MAGNETICS GMBH

The present invention relates to thermoplastic, isocyanate-free polyurethanes soluble in tetrahydrofuran and containing acidic groups, their preparation in the melt, their use as binders and magnetic recording media which contain them as binders in the magnetizable layer.

Magnetic recording media are having to meet increasingly high requirements with respect to the recording, the playback and also the aging resistance. The binder is becoming increasingly important for meeting these requirements.

Thus, a higher packing density of the magnetic material in the layer is being strived for in order to improve the magnetic properties, resulting in a reduction in the binder content in the layer. Attempts are also being made to achieve improved signal/noise ratio by using increasingly finely divided magnetic materials having a pronounced acicular shape. These materials are furthermore very often surface-modified, which reduces aging phenomena. As a result of such measures, both the dispersing of the pigments in the dispersing process and the achievement of good dispersion stability are becoming increasingly difficult. In general, however, the magnetic layers must be very flexible and must have high resilience and must possess high tensile strength. In addition, a reduction in the coefficient of friction and an increase in the abrasion and wear resistance are increasingly being required for avoiding drops in output level. Furthermore, the mechanical stability of the magnetic layer must also be guaranteed, particularly at high temperature and high atmospheric humidity.

It is known that magnetic layers which are subjected to high mechanical stresses advantageously contain polyurethane elastomers as binders. Polyesterurethanes as described in DE-B 1 106 959, DE-B 2 753 694, EP-A 0 069 955 or U.S. Pat. No. 2,899,411 have proven particularly useful.

However, these binders cannot be used in conjunction with the requirements and measures described above. In many cases, pigment wetting and pigment dispersing are adversely affected so that any sintered materials are only insufficiently broken up in the milling process or agglomeration of the pigment particles is not sufficiently prevented, leading to poor magnetic values and consequently to poor tape properties with respect to electroacoustics and video data. For this reason, small amounts of low molecular weight dispersants are added to facilitate the dispersing process. Although these dispersants have good dispersing behavior, they stabilize the dispersion only poorly. Higher molecular weight dispersing resins are therefore often also used as additional components. DE-A 30 26 357 and DE 31 37 293 describe, for example, the addition of polyester resins which have $SO_3M$ groups.

However, these processes for improving the dispersing process have disadvantages. Thus, low molecular weight dispersants may be readily exuded under disadvantageous climatic conditions, such as high temperature and/or high atmospheric humidity. In addition, in recording and playback apparatuses, deposits occur on all parts in contact with the tape, particularly on the head, resulting in drops in output level. Moreover, the friction (adhesion) increases considerably, with the result that the tape may come to a stop, i.e. block. On the other hand, the use of dispersing resins can give rise to compatibility problems in the dispersion. These substances are also often not film formers and therefore likewise cause blocking. Furthermore, the mechanical properties of these dispersing resins are often not tailored to the property level of polyurethane used as the main binder. A deterioration in the mechanical properties always also means an increase in the abrasion.

The use of low molecular weight dispersants leads to a total amount of dispersants which is unacceptable for the properties of the tape, since the amount depends on the coating per $m^2$ of the pigment surface. Since these dispersants contain polar groups, the hydrophilic character of the layer increases greatly and consequently—especially in a humid climate—also effects such a swelling of the layer, exudation of the dispersants and lubricants and changes in the mechanical property level due to changes in the plasticizer effects.

Consequently, the tendency of the tape to block is increased and soiling of the head is promoted.

To improve the dispersing properties of the polyurethane binder itself, it was proposed early on to incorporate polar groups into the binder. These polar groups can in principle be introduced via any component which is used in the preparation of the polyurethane. Polyesters having polar groups are most frequently used (inter alia DE-A 28 33 845). The incorporation of diols which additionally carry polar groups is described, for example, in JP-A 57 092 421, German Laid-Open Application DOS 38 14 536 or EP-A 193 084. The subsequent incorporation of the polar groups by $S_N$ reaction at the terminal OH groups of the polyurethanes is disclosed in JP-A 57 092 422. The polyurethanes described to date and carrying polar groups have improved dispersing behavior but the improvement is still insufficient for many requirements.

Another disadvantage of all polyurethanes described is that the required resilience is frequently accompanied by too low a hardness and a tendency to surface tack. Combining corresponding polyurethanes with other binders is therefore part of the prior art. Proposed binder combinations are, for example, mixtures of polyurethanes with phenoxy resins, with vinylidene chloride/acrylonitrile copolymers, with vinyl chloride/acrylate copolymers, with polycarbonates or polyesters. DE-A 32 39 160 may be mentioned by way of example. These binder combinations lead to an improvement in the mechanical properties of the magnetic layer, but the dispersing behavior of such a combination is poorer. Consequently, the particular properties of the magnetic materials have only an unsatisfactory effect. This is evident from a lower orientation ratio, lower residual induction and hence lower sensitivity at long and short wavelengths and an unsatisfactory maximum output level of the resulting recording media.

One possibility for increasing the hardness of the polyurethanes is to increase the concentration of urethane and urea groups. However, such measures very quickly lead to products which are insoluble in conventional solvents, such as MEK, toluene or THF (EP-A 143 337). According to DE-A 31 37 293, nonmagnetic particles are admixed for increasing the hardness.

However, these measures described are insufficient for simultaneously meeting the increased requirements with respect to the binder system. Moreover, the combination of the polyurethanes with other binders is often essential for achieving individual effects.

Disadvantages of the use of high molecular weight binders are the high solvent requirement, the relatively long dispersing times and/or the necessary 2-phase dispersing. In addition, in these binder systems too, particular properties of the magnetic materials have an unsatisfactory effect. This is evident from the low orientation ratio, low residual induction and hence low sensitivity at short and long wavelengths and an unsatisfactory maximum output level of the resulting recording media.

A substantial improvement in the dispersing behavior was achieved by means of low molecular weight, OH—containing polyurethanes as described in EP 99 533. However, these measures too are insufficient for dispersing the increasingly finely divided pigments and for meeting the constantly increasing requirements which the magnetic recording media have to fulfill with respect to mechanical properties and magnetic values.

The use of a thermoplastic polyurethane which is isocyanate-free, sulfonate-containing, branched, soluble in tetrahydrofuran and provided with OH—containing urea groups at the chain ends and has a molecular weight of from 4000 to 30,000 or from 30,000 to 200,000 as a binder for ferromagnetic pigments in magnetic recording media is disclosed in EP 490 233 and U.S. Pat. No. 5,266,408, respectively. The polyurethanes are composed of a polyol having a molecular weight of from 400 to 4000 or from 400 to 10,000, a diol of 2 to 18 carbon atoms, a sulfonate-containing diol, a small amount of a triol of 3 to 25 carbon atoms, a diisocyanate of 6 to 30 carbon atoms and a primary or secondary amino alcohol of 2 to 16 carbon atoms, the isocyanate groups being used in less than the stoichio-metric amount relative to the sum of the OH and NH groups used. The disadvantage of the process is the preparation of the polyurethanes in solvents. A polyaddition reaction in the absence of a solvent is thought to be impossible because of expected gel formation by the triols and amines used. Further improved dispersing of the increasingly finely divided pigments also appears desirable.

It is an object of the present invention to provide improved binders preparable in the absence of a solvent, in particular for extremely finely divided ferromagnetic pigments having a BET>40 $m^2g^{-1}$.

We have found that this object is achieved if a thermoplastic, isocyanate-free polyurethane which contains acidic groups, is soluble in tetrahydrofuran, has a molecular weight of from 15,000 to 70,000 and is composed of A) 1 mol of a polyol having a molecular weight of from 400 to 4000,
B) from 0.3 to 9 mol of a mixture of
  B1) if required, a diol of 2 to 18 carbon atoms and
  B2) from 0.03 to 0.4 mol of a diol having at least one acidic group,
C) from 0 to 1 mol of a polyol having 3 to 25 carbon atoms and at least 3 OH groups,
D) from 1.25 to 13 mol of a diisocyanate of 6 to 30 carbon atoms and
E) from 0 to 1 mol of a primary or secondary amino alcohol of 2 to 16 carbon atoms is used as the binder of the finely divided magnetic material, the molar ratio of the OH and any NH groups present in the sum of the components A, B, C and E to the NCO groups of component D being from 0.98 to 1.4 and the polyurethane being capable of being prepared by reacting the components in the melt. The preparation in the melt is advantageous since it takes place in the absence of a solvent and without gel formation. The binders prepared on the basis of the novel polyurethanes have improved dispersing properties, the magnetic pigment dispersions have better flow properties and furthermore the magnetic properties of the novel magnetic recording media are improved.

The molecular weight of the novel polyurethanes is from 15,000 to 70,000, corresponding to a K value according to H. Fikentscher (Cellulosechemie 13 (1932), 58 et seq.) (1% strength in dimethylformamide) of from 32 to 60. The polyurethanes used according to the invention as the binder in the magnetic layers generally have a hardness of from 20 to 130 S according to DIN 53157. Furthermore they have a modulus of elasticity (according to DIN 53457) of from 50 to 2500 $Nmm^{-2}$, an elongation at break of >74% (DIN 53455) and a tensile strength of from 20 to 70 $Nmm^{-2}$ (DIN 53455). The softening point is from 80 to 180° C. A pendulum hardness (DIN 53157) of from 25 to 125 S, a modulus of elasticity of from 55 to 2000 $Nmm^{-2}$, an elongation at break of from 85 to 350% and a tensile strength of from 25 to 50 $Nmm^{-2}$ are particularly advantageous.

For the preparation of the polyurethanes, a polyol, in particular a polydiol having a molecular weight of from 400 to 4000, preferably from 700 to 2500, is used as component A. The known polyesterols, polyetherols, polycarbonate-diols and polycaprolactonediols are suitable for this purpose.

The polyesterols are advantageously predominantly linear polymers having terminal OH groups, preferably those having 2 terminal OH groups. The acid number of the polyesterols is less than 10, preferably less than 3. The polyesterols can be prepared in a simple manner by esterifying aliphatic or aromatic dicarboxylic acids of 4 to 15, preferably 4 to 6, carbon atoms with glycols, preferably glycols of 2 to 25 carbon atoms, or by polymerizing lactones of 3 to 20 carbon atoms. Examples of suitable dicarboxylic acids are glutaric acid, pimelic acid, suberic acid, sebacic acid, dodecanoic acid and preferably adipic acid, succinic acid and phthalic acid. The dicarboxylic acids may be used individually or as mixtures. For the preparation of polyesterols it may be advantageous to use the corresponding acid derivatives, such as carboxylic anhydrides or carbonyl chlorides, instead of the dicarboxylic acids. Suitable aromatic dicarboxylic acids are terephthalic acid, isophthalic acid or mixtures of these with other dicarboxylic acids, eg. diphenic acid, sebacic acid, succinic acid and adipic acid. Examples of suitable glycols are diethylene glycol, 1,5-pentanediol, 1,10-decane-diol and 2,2,4-trimethyl-1,5-pentanediol. 1,2-Ethanediol, 1,4-butanediol, 1,6-hexanediol and 2,2-dimethyl-1,3-propanediol, 1,4-dimethylolcyclohexane, 1,6-dimethylol -cyclohexane and 1,4-diethanolcyclohexane and ethoxylated/propoxylated products of 2,2-bis(4-hydroxyphenylene)propane (bisphenol A) are preferably used. Depending on the desired properties of the polyurethanes, the polyols may be used alone or as a mixture in various ratios. Suitable lactones for the preparation of the polyesterols are, for example, α,α-dimethyl-β-propiolactone, γ-butyrolactone and preferably ε-caprolactone.

Polyesterols composed of 1,4-dimethylolcyclohexane and/or 1,6-dimethylolcyclohexane and a mixture of terephthalic acid and isophthalic acid with adipic acid, diphenic acid, sebacic acid and succinic acid are particularly preferably used as component A.

Polyetherols are essentially linear substances which have terminal hydroxyl groups, contain ether bonds and have a molecular weight of from about 600 to 4000, preferably from 1000 to 2000. Suitable polyetherols can readily be prepared by polymerizing cyclic ethers, such as tetrahydrofuran, or by reacting one or more alkylene oxides having 2 to 4 carbon atoms in the alkylene radical with an initiator molecule which contains two active hydrogen atoms bound in the alkylene radical. Examples of alkylene oxides are: ethylene oxide, 1,2-propylene oxide, epichlorohydrin and 1,2- and 2,3-butylene oxide. The alkylene oxides may be used individually, alternately in succession or as a mixture. Examples of suitable initiator molecules are: water, glycols, such as ethylene glycol, propylene glycol, 1,4-butanediol and 1,6-hexanediol, amines, such as ethylenediamine, hexamethylene-diamine and 4,4'-diaminodiphenylmethane, and amino alcohols, such as ethanolamine. As in the case of the polyesterols, the polyetherols, too, may be used alone or as mixtures.

The polycarbonatediols and their preparation are described in U.S. Pat. No. 4,131,731, and they are generally based on 1,6-hexane-diol.

If required, diols of 2 to 18, preferably 2 to 10, carbon atoms are used as building block B1), for example 1,2-ethanediol, 1,3-propanediol, 1,4-butanediol, 1,6-hexanediol, 1,5-pentanediol, 1,10-decanediol, 2-methyl-1,3-propanediol, 2-methyl-2-butyl-1,3-propanediol, 2,2-dimethyl-1,3-propane-diol, 2,2-dimethyl-1,4-butanediol, 2-ethyl-2-butyl-1,3-pro-panediol, neopentylglycol hydroxypivalate, diethylene glycol, triethylene glycol and methyldiethanolamine. The diols may be used individually or as mixtures. Diamines of 2 to 15 carbon atoms, such as ethylenediamine, 1,6-hexamethylenediamine, 4,9-dioxododecane-1,12-diamine or 4,4'-diamino-diphenylmethane, may also be used in an amount of up to 5% by weight, based on the total amount of B1. It has proven advantageous to incorporate the resulting urea groups into the polymer chain. The urea groups at the chain end are of minor importance. In the same way, said diols may also be partly replaced by water as building blocks B1).

The diols used as component B2) contain at least one acidic group, such as a carboxylic acid, phosphonic acid, phosphoric acid or sulfonic acid group. A suitable carboxylic acid-containing diol is, for example, 2,2-bis(hydroxymethyl)propionic acid. The diol component B2) preferably contains at least one $SO_3M$ group, where M is hydrogen, an alkali metal ion, eg. Li, Na or K, or an ammonium radical, such as $NH_4$. Both long-chain diols having $SO_3M$ substituents which are bonded to the chain end and short-chain branched diols in which the $SO_3M$ groups are present in the branch chain, preferably at the end thereof, may be used.

Suitable diols B2) are, for example, compounds of the formula (I) as described in DE 34 07 562

$$R^1CH_2O\text{---}(C_2H_4O)_n(C_3H_6O)_mCH_2\text{---}CHR^3\text{---}CH_2\text{---}SO_3M \quad (I)$$

where
$R^1$ is $HO\text{---}CH_2\text{---}CH(OH)\text{---}$ or $R^2\text{---}C(CH_2OH)_2\text{---}$,
$R^2$ is $CH_3\text{---}$, $C_2H_5\text{---}$ or $C_3H_7\text{---}$,
$R^3$ is H— or $CH_3\text{---}$,
X is H— or an alkali metal or ammonium ion,
n is from 0 to 20,
m is from 0 to 20 and
n+m is from 1 to 20, and the diol may have a total of up to 65 carbon atoms,
and diols of the formula (II), some of which are described in EP-A 414 102:

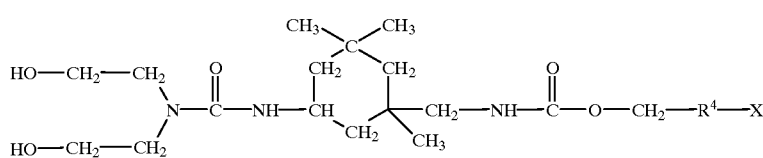
(II)

where $R^4$ is a straight-chain or branched or cyclic radical of 1 to 10 carbon atoms which may be substituted by heteroatoms, or is

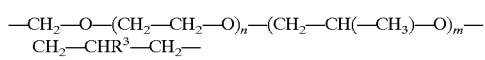

where $R^3$ is H or $CH_3$, n is from 0 to 100, m is from 0 to 50 and n+m>1, and
X is $SO_3M$, where M is H, Li, Na, K or ammonium.

The compound of the formula (I), where $R^1$ is $R^2\text{---}C(CH_2OH)_2\text{---}$, $R^2$ is ethyl, $R^3$ is H, X is sodium and m+n is from 17 to 20, n being>m, is particularly preferred as component B2) and is commercially available under the trade name Tegomer DS 3117 (from Goldschmidt).

The ratio of the components B1) and B2) is advantageously chosen according to the specific surface area of the magnetic material used. In general, the ratio B1:B2 is from 4 to 100.

Any polyols (component C) present are compounds of 3 to 18, preferably 3 to 6, carbon atoms. Examples of usable polyols are glycerol or trimethylolpropane. Low molecular weight reaction products of, for example, trimethylolpropane with ethylene oxide and/or propylene oxide are also suitable. For example, erythritol, pentaerythritol and sorbitol may be used as polyols. The presence of polyols in the polyaddition reaction leads to branching of the end product which, unless local crosslinking occurs, has an advantageous effect on the mechanical properties of the polyurethane. Surprisingly, however, no gel formation takes place during the preparation of the polyurethanes in the melt.

For formation of the polyurethanes, the components stated under A) and B) and, if required, those stated under C) and E) are reacted with aliphatic, cycloaliphatic or aromatic diisocyanates of 6 to 30 carbon atoms (component D). Compounds such as toluylene 2,4-diisocyanate, toluylene 2,6-diisocyanate, meta- and para-tetramethylxylene diisocyanate, meta-phenylene diisocyanate, 4-chlorophenylene 1,3-diisocyanate, naphthylene 1,5-diisocyanate, hexamethylene 1,6-diisocyanate, hexamethylene 1,5-diisocyanate, cyclohexylene 1,4-diisocyanate and tetrahydronaphthylene 1,5-diisocyanate, diphenylmethane 4,4'-diisocyanate, dicyclohexylmethane diisocyanate, isophorone diisocyanate and mixtures thereof are suitable for this purpose. Diphenylmethane 4,4'-diisocyanate is particularly preferably used.

If required, urea groups can be introduced into the novel polyurethane by using the component E) and, with the addition of E) after the beginning of the reaction of the components A), B) and C) with D), terminal OH groups can be introduced into the novel polyurethane. The amino alcohols of 2 to 16, preferably 3 to 6, carbon atoms which are used as component E) are, inter alia, monoethanolamine, methylisopropanolamine, ethylisopropanolamine, methylethanolamine, 3-aminopropanol, 1-ethylaminobutan-2-ol, 4-methyl-4-aminopentan-2-ol and N-(2-hydroxyethyl) aniline. Diolamines are particularly suitable since, owing to their addition at the chain end, the OH number of the polymers is doubled. Diethanolamine and diisopropanolamine have proven particularly advantageous.

The ratio of components A) to E) to one another can be varied from 1.25 to 13 mol of diisocyanate per mol of polydiol with the use of from 0.3 to 9, preferably from 1 to 6, mol of the diol of component B) and from 0 or 0.1 to 1, preferably from 0 or 0.2 to 0.4, mol of the polyol of component C), the amount of the diol used partially depending on the molecular weight of the polydiol used. The amount of the isocyanate used is such that the molar ratio of the OH and any NH groups in the sum of components A), B), C) and E) to the NCO groups of the components D) is from 0.98 to 1.4, preferably from 1.01 to 1.25, so that virtually no free, unconverted isocyanate remains at the end of the reaction but free, unconverted hydroxyl groups do remain. The component E) can be either reacted together with the diols or, preferably, not added until after the beginning of the reaction of the diols with the isocyanate groups.

Examples of suitable catalysts for the preparation of the polyurethanes and for the crosslinking reaction are tertiary amines, such as triethylamine, triethylenediamine, N-methyl-pyridine and N-methylmorpholine, metal salts, such as tin octanoate, lead octanoate and zinc stearate, and organometallic compounds, such as dibutyltin dilaurate. The suitable amount of catalyst is dependent on the activity of the suitable catalyst. In general, it has proven advantageous to use from 0.005 to 0.3, preferably from 0.01 to 0.1, part by weight per 100 parts by weight of polyurethane.

The thermoplastic polyurethanes having this composition are prepared in the melt in the absence of a solvent. For this purpose, the components can be melted in conventional apparatuses, for example mixing-kneading reactors, mixed and reacted. The preparation of the novel polyurethanes is particularly preferably carried out in an extruder. Conventional extruders which are equipped with one screw or two— corotating or counterrotating—screws may be used. They preferably have additional kneading elements. Suitable extruders are, for example, the extruders of the ZKS series from Werner & Pfleiderer.

The individual components can be fed to the extruder either in molten form or in solid form, for example as flakes. The building blocks A), B), C) and E) can be mixed either outside the extruder or in the extruder itself. The component E) can, if required, be added either at the beginning or at a later time during the reaction. The component D) is preferably metered in via a separate feed. If different isocyanate components are used, they may, if required, be premixed. The type and number of feeds and the residence time in the extruder are dependent on the reaction conditions required in each case, ie. on the reactivity of the components, the heat of reaction, etc. The reaction temperature is in general from 120 to 200° C., and the temperature used is determined from the melting points and the solubility of the components and the heat stability of the components and of the polyurethane product. The temperature may be varied during the reaction; for example, it may be increased in an advantageous manner from one section of the extruder to the other. The product discharged from the extruder is recovered and comminuted in a conventional manner, for example granulated under water and dried. If required, heating at from 50 to 80° C. may follow. During storage at room temperature or possibly during heating, any small amounts of isocyanate groups still present react, so that an isocyanate-free polyurethane results in every case.

The thermoplastic polyurethane prepared according to the invention is soluble in the conventional polar solvents, such as ethers, eg. tetrahydrofuran or dioxane, ketones, eg. methyl ethyl ketone or cyclohexanone, esters, eg. ethyl acetate, or hydrocarbons, eg. alkanes or aromatics, or mixtures of these solvents. Surprisingly, it has been found that, in comparison with the polyurethanes prepared from the same components in solution (cf. EP 490 223), the novel polyurethanes have advantageous properties. They are particularly suitable for dispersing magnetic pigments, especially finely divided magnetic pigments, as used for high-density magnetic recording systems, for example in the video sector, in the audio sector or in the data sector. The magnetic dispersions obtained have better flow properties and the magnetic layers produced therefrom have higher gloss values. Moreover, they also meet the requirements mentioned at the outset for binders for magnetic layers, ie. good dispersing effect and rapid dispersing, good stabilization of the dispersion, low solvent requirement in the preparation of the dispersion, good leveling on casting of the dispersion, high pigment content of the layer, good orientability of the magnetic needles and good mechanical properties of the magnetic layer, even at high temperatures. The present invention therefore also relates to magnetic recording materials which contain the novel polyurethanes as binders in the magnetic layer.

The novel polyurethanes are particularly suitable as binders. They can be used as sole binders for the production of magnetic layers, but it is advantageous for special intended uses in the case of magnetic recording media according to the invention to add at least one further binder component in amounts of less than 70, preferably less than 40, parts by weight, based on the resulting total amount of binder.

The physically drying binders which may be present as cobinders in the binder mixture are known. These include a polyvinyl formal binder which is prepared by hydrolyzing a polymer of a vinyl ester and then reacting the vinyl alcohol polymer with formaldehyde. The polyvinyl formals advantageously contain at least 65, in particular at least 80, % by weight of vinyl formal groups. Particularly suitable polyvinyl formals contain from 5 to 13% by weight of vinyl alcohol groups and from 80 to 88% by weight of vinyl formal groups and have a density of about 1.2 and a viscosity of from 50 to 120 mPa.s, measured at 20° C. using a solution of 5 g of polyvinyl formal in 100 ml of 1:1 phenol/toluene. In addition to the polyvinyl formal, vinyl chloride/diol mono- or di(meth)acrylate copolymers, which can be prepared, for example, in a manner known per se by solution copolymerization or suspension copolymerization of vinyl chloride and the diol mono(meth)acrylate or di(meth) acrylate, are suitable in a similar manner. The diol mono- or diacrylate or -methacrylate used for this purpose is an esterification product of acrylic acid or methacrylic acid with the corresponding molar amount of aliphatic diol of 2 to 4 carbon atoms, such as ethylene glycol, 1,4-butanediol and preferably propanediol, the propanediol preferably consisting of 1,3-propanediol and from 0 to 50% by weight of 1,2-propanediol. The copolymers advantageously contain from 50 to 95% by weight of vinyl chloride and from 5 to 50% by weight of diol acrylate or methacrylate. Particularly suitable copolymers preferably contain from 70 to 90% by weight of vinyl chloride and from 10 to 30% by weight of diol monoacrylate or diol monomethacrylate. A 15% solution of particularly suitable copolymers, such as the vinyl chloride/propanediol monoacrylate copolymers, in a mixture of equal parts by volume of tetrahydrofuran and dioxane, has a viscosity of about 30 mPa.s at 25° C. The K value of the particularly suitable products is from 30 to 50, preferably about 40.

In addition, phenoxy resins having repeating units of the formula

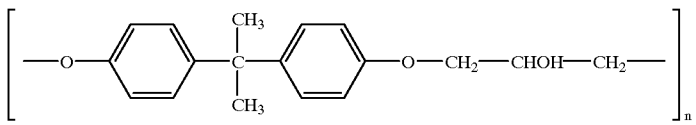

where n is approximately equal to 100, may be used as cobinders. These are polymers as known under the trade names Epikote® from Shell Chemical Co. or under the name Epoxidharz PKHH® from Union Carbide Corporation.

Cellulose ester binders are also suitable for use in said binder mixture. These are esterification products of cellulose with nitric acid or with carboxylic acids of 1 to 4 carbon atoms, eg. cellulose acetate, cellulose triacetate, cellulose acetopropionate or cellulose acetobutyrate.

The use of a cobinder component without dispersing activity, eg. VAGH®, Pioloform® or PKHH®, etc., may lead to a deterioration in the dispersing effect or in the stability of the dispersion, since the amount of polyurethane having dispersing activity is reduced.

The use of, for example, sulfonate-containing vinyl chloride copolymers, for example according to U.S. Pat. No. 4,748,084, as cobinders has proven advantageous, said copolymers being available as the commercial product MR 110® from Nippon Zeon.

The use of from 0 to 30t of a dispersing resin according to German Laid-Open Applications DOS 195 16 784 and DOS 44 46 383 is likewise possible according to the invention. In accordance with their stepwise preparation, these polyurethane urea acrylates have an organophilic, polymeric main chain which is multiply branched at one of its ends, the outermost branches carrying acidic groups.

The further processing of the binder mixture with magnetic materials and assistants to give magnetic recording media is carried out in a manner known per se.

Anisotropic magnetic materials which may be used are the pigments known per se, which substantially influence the properties of the resulting magnetic layers, for example gamma-iron(III) oxide, finely divided magnetite, ferromagnetic undoped or doped chromium dioxide, cobalt-modified gamma-iron(III) oxide, barium ferrites or ferromagnetic metal particles. Acicular, in particular dendrite-free, cobalt-modified or unmodified gamma-iron(III) oxide and ferromagnetic chromium dioxide and metal pigment are preferred. The use of metal pigment is particularly preferred. The particle size is in general from 0.05 to 1 $\mu$m, preferably from 0.08 to 0.5 $\mu$m. The specific surface area is in general at least 40, preferably from 50 to 200, m$^2$/g (BET method)

The novel binders may be used in formulations without additional use of low molecular weight dispersants. However, it is also possible to add dispersants, eg. lecithin, zinc oleate or zinc stearate, in amounts which are small compared with the prior art.

Furthermore, the magnetic layers contain small amounts of additives, such as lubricants, as well as fillers, which are admixed during the dispersing of the magnetic materials or during the production of the magnetic layer. Examples of such additives are fatty acids or isomerized fatty acids, such as stearic acid or the salts thereof with metals of the first to fourth main group of the Periodic Table of Elements, and fatty esters, such as butyl stearate, or waxes, silicone oils, carbon black, etc. The amount of the additives is the customary one and is in general less than 10% by weight, based on the magnetic layer.

The ratio of magnetic material to binder in the novel recording materials is from 1 to 10, in particular from 3 to 6, parts by weight of magnetic material per part by weight of the binder mixture. It is particularly advantageous that, owing to the excellent pigment binding power of the special polyurethanes, high magnetic material concentrations in the magnetic layers, for example up to 90% by weight, based on the total weight of the magnetic layer, are possible without the mechanical-elastic properties deteriorating or the performance characteristics markedly suffering.

Suitable nonmagnetic and nonmagnetizable substrates are the conventional rigid or flexible substrate materials, in particular films of linear polyesters, such as polyethylene terephthalate, in general in thicknesses of from 4 to 200 $\mu$m, in particular from 6 to 36 $\mu$m. Recently, the use of the magnetic layers on paper substrates for electronic computing and counting machines has also become important; here too, the novel coating materials can be advantageously used.

The novel magnetic recording media can be produced in a manner known per se. Advantageously, the magnetic pigment dispersion (component 1) prepared in a dispersing apparatus, for example a tubular ball mill or a stirred ball mill, from the magnetic material and a solution of the binders with the addition of lubricants and possibly small amounts of dispersants is filtered, if necessary after admixing a polyisocyanate crosslinking agent (component 2), and is applied by means of a conventional coating apparatus, for example a knife coater, to the nonmagnetic substrate. As a rule, magnetic orientation is carried out before the liquid coating mixture is dried on the substrate; the latter is advantageously effected in the course of from 10 to 200 seconds at from 50 to 90° C. The magnetic layers can be calendered and compacted on conventional apparatuses by being passed between heated and polished rolls, if necessary with application of pressure and at temperatures of from 25 to 100° C., preferably from 60 to 90° C. In the case of crosslinking binders, it has proven very advantageous to carry out the calendering before the crosslinking is complete, since the OH polymers in the uncrosslinked state are very thermoplastic without being tacky. The thickness of the magnetic layer is in general from 0.5 to 20 $\mu$m, preferably from 1 to 10 $\mu$m. In the case of the production of magnetic tapes, the coated films are slit in a longitudinal direction into the conventional widths generally specified in inches.

A polyisocyanate (component 2) may be added to the dispersion of a crosslinking. This is generally done before the application to the substrate. A plurality of organic di-, tri- or polyisocyanates or isocyanate prepolymers having a molecular weight of up to 10,000, preferably from 500 to 3000, may be used for the crosslinking. Polyisocyanates or isocyanate prepolymers which carry more than two NCO groups per molecule are preferred. Polyisocyanates based on toluylene diisocyanate, hexamethylene diisocyanate or isophorone diisocyanate, which are formed by a polyaddition reaction of di- or triols or by biuret and isocyanurate formation, have proven particularly suitable. An adduct of toluylene diisocyanate with trimethylolpropane and diethylene glycol is particularly advantageous. Depending on the requirements set for the recording material, the amount of added polyisocyanate component may be a substoichiometric amount down to 70%, preferably down to 50%, or an excess of up to 100%, preferably up to 50%, based on the OH groups of the polyurethane binder to be crosslinked.

If any cobinders used carry groups reactive toward isocyanate (eg. —OH), they can also be incorporated into the network when crosslinking agents are used.

In the Examples and Comparative Experiments which follow, parts and percentages are by weight, unless stated otherwise. Parts by volume bear the same relation to part by weight as that of the liter to the kilogram.

EXAMPLES

1. Synthesis of the polymers

A reaction extruder of the type 20.34 from Leistritz, having a screw diameter D of 34 mm and a screw length of 35 D is used for the preparation of the products described. The alcohol components are mixed in the molar ratio stated in Table 2 in a vessel at 120° C., and tetrabutyl orthotitanate is added as the catalyst (50 ppm, based on alcohol components). The isocyanate component MDI (=diphenylmethane 4,4'-diisocyanate) is initially taken separately at 65° C. The raw materials are metered by means of a piston pump in a closed system into the first barrel at a screw speed of 280 min$^{-1}$, the raw materials components first being thoroughly mixed in a screw mixing zone and being reacted in the downstream conveying zone. The NCO/OH ratio is established by means of the metering streams. The temperature profile of the extruder barrels is chosen so that the initial temperature is 200° C. and the temperature decreases in the direction of flow (to about 160° C.). After leaving the extruder, the highly viscous melt falls via a hot face cutting means into a stream of water. The granules are superficially freed from adhering water in a centrifugal dryer. The products are then heated at 80° C. for 15 hours.

The polyesterols used as polydiol are shown in Table 1.

TABLE 1

Polydiols

| Polyesterol | Alcohols | Acids (molar ratio) | OH number |
|---|---|---|---|
| A | 1,4-Bis(hydroxymethyl)cyclohexane | Adipic acid/ isophthalic acid (1:1) | 143 |
| B | 1,4-Bis(hydroxymethyl)cyclohexane | Adipic acid/ isophthalic acid (1:1) | 75 |
| C | 1,4-Bis(hydroxymethyl) cyclohexane | Adipic acid | 136 |

The weight average molecular weight (Mw) is determined by means of gel permeation chromatography (eluent: tetrahydrofuran, polystyrene standards). The K values are measured in 1% strength solution in dimethylformamide according to H. Fikentscher, Cellulose Chemie B(3) (1932), 58–64. The results are stated in Table 2 for polymers I to VII.

TABLE 2

EMTEC Magnetics GmbH
Synthesis of the polymers

| Polymer | OH components (molar ratio) | OH/NCO ratio | K value | Mw (GPC) |
|---|---|---|---|---|
| I | Polyesterol A (8.8) 1,6-Hexanediol (10.9) Tegomer DS 3117[1]) (0.4) | 1.04 | 49 | 43,000 |
| II | Polyesterol A (6.8) Tegomer DS 3117 (1.0) | 1.15 | 35 | 23,000 |
| III | Polyesterol B (6.0) 1,4-Butanediol (3.57) Tegomer DS 3117 (0.43) | 1.10 | 38 | 30,000 |

TABLE 2-continued

EMTEC Magnetics GmbH
Synthesis of the polymers

| Polymer | OH components (molar ratio) | OH/NCO ratio | K value | Mw (GPC) |
|---|---|---|---|---|
| IV | Polyesterol C (6.09) 1,4-Butanediol (0.362) Tegomer DS 3117 (0.29) | 1.06 | 40 | 32,000 |
| V | Polyesterol A (4.2) 2-(Hydroxymethyl)-2-ethyl-hexanol(4.4) Tegomer DS 3117 (0.29) | 1.12 | 44 | 29,000 |
| VI | Polyesterol C (8.4) 2,2-Dimethyl-1,3-propanediol (1.67) 2,2-Bis(hydroxymethyl)butanol (0.3) Tegomer DS 3117 (0.13) | 1.04 | 54 | 70,000 |
| VII | Polyesterol C (10.5) 1,4-Butanediol (6.3) Tegomer DS 3117 (0.5) | 1.06 | 4D | 31,000 |

1) Tegomer DS 3117 is a polyether-1,3-diol sulfonate from Goldschmidt, Mw 1340 g/mol

2. Synthesis of comparative polyurethanes in solution

Polymer I*

Polyesterol A (6.1 mol), 1,6-hexanediol (7.6 mol) and Tegomer DS 3117 (0.3 mol) are dissolved in 15.7% strength tetrahydrofuran, 50 ppm of dibutyltin dilaurate and diphenylmethane 4,4'-diisocyanate (14 mol) are added and stirring is carried out at 60° C. The NCO content of the reaction solution is continuously monitored. On reaching an NCO concentration of 0.088% by weight, bis(hydroxymethyl) amine (0.47 mol) is added. The resulting product has a K value of 41 and a molecular weight of 33,000.

Polymer VII*

The procedure is as for the synthesis of polymer I*. 18.5 mol of polyesterol C, instead of polyesterol A, 11 mol of 1,4-butanediol, instead of 1,6-hexanediol, 0.9 mol of Tegomer DS 3117 and 30.4 mol of diphenylmethane 4,4'-diisocyanate are used. The product has a K value of 39 and a molecular weight (Mw, GPC) of 29,000.

Polymer I**

The synthesis of polymer I* is modified in such a way that only 13.46 mol of diphenylmethane 4,4'-diisocyanate are added. The reaction is continued at 60° C. until the NCO content is <0.01%. No bis(hydroxyethyl)amine is added. The product obtained has a K value of 43 and an Mw of 44,000.

Polymer VII**

The synthesis is carried out similarly to the synthesis of polymer VII*. The amount of diphenylmethane 4,4'-diisocyanate is reduced to 29.2 mol. The reaction is continued until the NCO content is <0.01%. The product has a K value of 42 and a molecular weight of 36,000.

3. Dispersing of metal pigment—evaluation of gloss and flow behavior 200 g of ceramic balls (diameter 1.5 mm), 42.5 g of pure iron pigment (surface area 59 m$^2$g), 18 g of a 20% strength solution of polymer in tetrahydrofuran and 113 g of tetrahydrofuran are weighed into a 250 ml glass flask. The mixture is shaken on a Red Devil Paint Shaker for 12 hours (phase I). A further 18 g of the polymer solution and 15 g of tetrahydrofuran are added to the mixture, and the mixture is dispersed for a further hour (phase II). To test the stability of the dispersion, the ceramic balls are removed by filtration and the mixture is stored for 24 hours on a roll mill. After phase I and phase II and after the storage, a sample of the dispersion is applied by means of a manual knife coater (100 µm) to a PET film and is dried at room temperature and the gloss of this coating is determined. A reflectometer from Dr. Lange is used for this purpose, the angle of incidence and angle of measurement being 60°. In addition, the flow behavior of the dispersions and the surface quality are evaluated. Satisfactory and stable dispersions are distinguished by the fact that the gloss value is very high, that the gloss is not adversely affected by the storage and that the dispersion has good flowability and a low flow limit and, after application of the coat, gives a smooth surface without agglomerates.

TABLE 3

| Polymer | Gloss, phase I | Gloss, phase II | Gloss, storage | Evaluation |
|---------|----------------|-----------------|----------------|------------|
| I | 70 | 115 | 109 | good flowability, smooth surface |
| II | 71 | 145 | 154 | good flowability, low viscosity, very smooth surface |
| III | 65 | 114 | 112 | good flowability, smooth surface |
| IV | 80 | 130 | 127 | good flowability, smooth surface |
| V | Not measurable | 125 | 126 | good flowability, smooth surface |
| VI | 65 | 125 | 125 | good flowability, smooth surface |
| VII | 68 | 130 | 120 | good flowability, smooth surface |
| I* | Not measurable | 109 | 85 | high flow limit, rough |
| I** | Not measurable | 93 | 40 | high flow limit, coagulation, rough, agglomerates |
| VII* | Not measureable | 51 | not measureable | flow limit, coagulation, agglomerates |
| VIII** | Not measureable | 75 | 75 | flowable, rough surface |

4. Dispersing on the industrial scale—evaluation of the surface properties and of the magnetic and mechanical properties of the recording media.

A mixture of 100 parts by weight of a ferromagnetic metal pigment ($H_c$=117 kA/m; SSA=51 $m^2$/g; average particle length 170 nm, mean particle diameter 25 nm), 10% by weight of α-alumina (average particle diameter 320 nm), 2 parts by weight of carbon black (BET=35 $m^2$/g; primary particle size=50 nm), 11 parts by weight of the novel polymer II, 7 parts by weight of a VC copolymer having polar anchor groups (MR 110 from Nippon Zeon), 2.5 parts by weight of stearic acid, 15 parts by weight of tetrahydrofuran and 15 parts by weight of dioxane was kneaded in a batch kneader (IKA high-performance kneader type HKD 10, from IKA-Maschinenbau, Staufen) for 2 hours (solids content of the kneading phase: 81.5% by weight).

A mixture of 145 parts by weight of tetrahydrofuran and 145 parts by weight of dioxane was then added a little at a time to the kneaded material in a dissolver with vigorous stirring, and dispersing was then carried out for 9 hours using a stirred ball mill. 1 part by weight of butyl stearate, 5.2 parts by weight of a 50% strength by weight solution of the reaction product of 3 mol of toluene diisocyanate with 1 mol of trimethylolpropane in tetrahydrofuran and, a little at a time, a mixture of 40 parts by weight of tetrahydrofuran and 40 parts by weight of dioxane were then added to the dispersion with vigorous stirring. After filtration through a filter having a pore size of 2 μm, a homogeneous, finely divided and flock-free dispersion stable to settling out and capable of being applied as a coating was obtained (solids content of the dispersion: 25.3%).

The dispersion was applied to a polyethylene terephthalate film having a backing coating, to give a layer which was 3 μm thick when dry. Before drying, the coated web was passed through an orientation zone consisting of a coil having a field strength of 200 kA/m, in order to orient the ferromagnetic pigments. After drying at 80° C., the film web was surface treated in a steel/steel calender having 6 gaps at 85° C. and a pressure of 200 kg/cm and was then slit into ½ inch wide video tapes.

Comparative Example

The procedure was as described above, except that the novel polyurethane II was replaced by an equivalent weight of a commercial polyurethane without anchor groups (Morthane CA 371, from Morton).

The measured results obtained are shown in Table 4.

TABLE 4

|  | Example | Comparative Example |
|---|---|---|
| Duration of kneading + dispersing (hours) | 2 + 9 | 2 + 13 |
| Gloss 1 | 140 | 115 |
| Gloss 2 | 138 | 105 |
| Surface defects | none | none |
| HF output level (dB) | +2.3 | +0.5 |
| S/N (dB) | +1.6 | +0.1 |
| Abrasion at the video head (rating) | 1.5 | 3 |
| Coefficient of friction, RAF test | 21 | 29 |

The measured values (Table 4) have the following meanings:

Gloss measurement:

The reflection at an angle of 60° from the uncalendered layer is measured.

Gloss 1: Gloss value immediately after the end of dispersing
Gloss 2: Gloss value after 24 hours on a roller stand The higher the gloss value, the better the pigment dispersing.

HF Output level:

The high-frequency output level was measured in a Betacam SP recorder (system BVW 75, from Sony) against the reference tape Sony RSB 01 SP. The higher the HF output level, the better the tape.

S/N (luminance):

The luminance signal was measured in a Betacam SP recorder (system BVW 75, from Sony) against the reference tape Sony RSB 01 SP. The higher the S/N value, the better the tape.

Coefficient of friction:

The coefficient of friction in the RAF test was determined with a sample length of 150 mm and a measuring distance of 100 mm. After conditioning for 15 minutes at 40° C. and 80% relative humidity, the piece of tape was drawn back and forth over a steel pin (diameter 2.5 mm, angle of wrap 90°) over a length of 100 mm with a force of 2 N and at a speed of 20 mm/s. The coefficient of friction after 100 cycles under the abovementioned conditions was measured. The lower the value, the better the running properties of the tape.

We claim:

1. A thermoplastic, isocyanate-free polyurethane which contains acidic groups, is soluble in tetrahydrofuran, has a molecular weight of from 15,000 to 70,000 and is composed of A) 1 mol of a polyol having a molecular weight of from 400 to 4000, B) from 0.03 to 9 mol of a mixture of
B1) if required, a diol of 2 to 18 carbon atoms and
B2) from 0.03 to 0.4 mol of a diol having at least one acidic group, C) from 0 to 1 mol of a polyol having 3 to 18 carbon atoms and at least 3 OH groups, D) from 1.25 to 13 mol of a diisocyanate of 6 to 30 carbon atoms and E) from 0 to 1 mol of a primary or secondary amino alcohol of 2 to 16 carbon atoms, the molar ratio of the OH and any NH groups present in the sum of the components A, B, C and E to the NCO groups of component D being from 1.01 to 1.4, obtained by reacting the above components in the melt.

2. A polyurethane as claimed in claim 1, wherein the component B2) is a diol having at least one carboxylic acid, phosphoric acid, phosphonic acid or sulfonic acid group.

3. A polyurethane as claimed in claim 1, wherein the component B2) is a diol having at least one sulfonic acid group.

4. A polyurethane as claimed in claim 1, wherein the component B2) is a compound of the formula (I)

$$R^1CH_2O\text{—}(C_2H_4O)_n(C_3H_6O)_m CH_2\text{—}CHR^3\text{—}CH_2\text{—}SO_3X \quad (I)$$

where $R^1$ is HO—CH$_2$—CH(OH)— or $R^2$—C(CH$_2$OH)$_2$—, $R^2$ is CH$_3$—, C$_2$H$_5$— or C$_3$H$_7$—, $R^3$ is H— or CH$_3$—, X is H— or an alkali metal or ammonium ion, n is from 0 to 20, m is from 0 to 20 and n+m is from 1 to 20, and the diol may have a total of up to 65 carbon atoms.

5. A polyurethane as claimed in claim 1, wherein the component B2) is a diol of the formula (II)

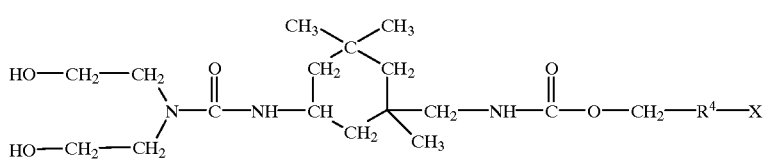

(II)

where $R^4$ is a straight-chain or branched or cyclic radical of 1 to 10 carbon atoms which may be substituted by heteroatoms, or is a radical of the formula

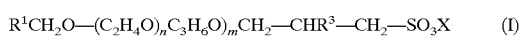

where $R^3$ is H or CH$_3$, n is from 0 to 100, m is from 0 to 50 and n+m≧1, and x is —SO$_3$M, where M is H, Li, Na, K or ammonium.

6. A polyurethane as claimed in claim 1, wherein diphenylmethane 4,4'-diisocyanate is used as component D).

7. A polyurethane as claimed in claim 1, wherein some of the component B1 is replaced by diamines of 2 to 15 carbon atoms.

8. A polyurethane as claimed in claim 1, wherein some of the component B1 is replaced by water.

9. A polyurethane as claimed in claim 1, wherein the K value of the polyurethanes is from 32 to 60.

10. A process for the preparation of polyurethanes as claimed in claim 1, wherein A) 1 mol of a polyol having a molecular weight of from 400 to 4000, B) from 0.03 to 9 mol of a mixture of
B1) if required, a diol of 2 to 18 carbon atoms and
B2) from 0.03 to 0.4 mol of a diol having at least one acidic group, C) from 0 to 1 mol of a polyol having 3 to 18 carbon atoms and at least 3 OH groups, D) from 1.25 to 13 mol of a diisocyanate of 6 to 30 carbon atoms and E) from 0 to 1 mol of a primary or secondary amino alcohol of 2 to 16 carbon atoms are reacted in the melt.

11. A process as claimed in claim 10, wherein the components are reacted in an extruder.

12. A magnetic recording medium, comprising a nonmagnetic substrate material and at least one magnetic layer firmly applied thereon and comprising a magnetic material, the magnetic layer containing at least one thermoplastic polyurethane as claimed in claim 1.

13. A magnetic recording medium, comprising a nonmagnetic substrate material and at least one magnetic layer firmly applied thereon and comprising a magnetic material, the magnetic layer containing at least one thermoplastic polyurethane as claimed in claim 1, which is crosslinked with an isocyanate which is selected from di-, tri- and polyisocyanates and isocyanate prepolymers having a molecular weight of up to 10,000.

14. A magnetic recording medium as claimed in claim 12, which contains said polyurethane as the sole binder.

15. The use of a polyurethane as claimed in claim 1, as a binder.

* * * * *

UNITED STATES PATENT AND TRADEMARK OFFICE
CERTIFICATE OF CORRECTION

PATENT NO.: 6,132,880

DATED: October 17, 2000

INVENTOR(S): WEINGART et al.

It is certified that error appears in the above-identified patent and that said Letters Patent is hereby corrected as shown below:

On the cover page, the title should be:
--POLYURETHANES PREPARABLE IN THE ABSENCE OF A SOLVENT AND THEIR USE AS BINDERS FOR MAGNETIC RECORDING MEDIA--.

Signed and Sealed this

Eighth Day of May, 2001

Attest:

NICHOLAS P. GODICI

Attesting Officer

Acting Director of the United States Patent and Trademark Office